(12) United States Patent
Kim et al.

(10) Patent No.: US 10,572,004 B2
(45) Date of Patent: Feb. 25, 2020

(54) HEAD MOUNTED DISPLAY DEVICE AND IMAGE CORRECTION METHOD FOR THE SAME

(71) Applicant: Samsung Display Co., Ltd., Yongin-Si, Gyeonggi-Do (KR)

(72) Inventors: Seongkyun Kim, Seoul (KR); Jonggil Kim, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/861,003

(22) Filed: Jan. 3, 2018

(65) Prior Publication Data

US 2018/0196507 A1    Jul. 12, 2018

(30) Foreign Application Priority Data

Jan. 9, 2017  (KR) .................. 10-2017-0002806

(51) Int. Cl.
| | | |
|---|---|---|
| *G06F 3/01* | (2006.01) | |
| *G02B 27/01* | (2006.01) | |
| *H04N 13/106* | (2018.01) | |
| *H04N 13/344* | (2018.01) | |
| *H04N 13/383* | (2018.01) | |
| *H04N 13/398* | (2018.01) | |
| *G02B 27/00* | (2006.01) | |

(52) U.S. Cl.
CPC ......... *G06F 3/012* (2013.01); *G02B 27/0172* (2013.01); *G06F 3/011* (2013.01); *H04N 13/106* (2018.05); *H04N 13/344* (2018.05); *H04N 13/383* (2018.05); *H04N 13/398* (2018.05); *G02B 27/0093* (2013.01); *G02B 27/017* (2013.01); *G02B 2027/014* (2013.01); *H04N 2213/002* (2013.01)

(58) Field of Classification Search
None
See application file for complete search history.

(56) References Cited

U.S. PATENT DOCUMENTS

| | | | |
|---|---|---|---|
| 9,443,355 B2 | 9/2016 | Chan et al. | |
| 2004/0151390 A1* | 8/2004 | Iwamura | G06F 3/1462 382/236 |
| 2015/0379772 A1* | 12/2015 | Hoffman | G06T 19/006 345/633 |
| 2016/0260251 A1 | 9/2016 | Stafford et al. | |

* cited by examiner

*Primary Examiner* — Christopher J Kohlman
(74) *Attorney, Agent, or Firm* — Cantor Colburn LLP

(57) ABSTRACT

A head mounted display device includes a head mounted display panel, a motion tracker which tracks a movement of the head mounted display panel according to a head movement of a user and outputs sensing data, an image corrector which shifts and outputs entire image data based on the sensing data when the head mounted display panel rotates, a data driver which converts the entire image data output from the image corrector into a data signal and provides the data signal to the head mounted display panel, and a scan driver which provides a scan signal to the head mounted display panel.

18 Claims, 12 Drawing Sheets

HEAD MOUNTED DISPLAY DEVICE AND IMAGE CORRECTION METHOD FOR THE SAME

This application claims priority to Korean Patent Application No. 10-2017-0002806, filed on Jan. 9, 2017, and all the benefits accruing therefrom under 35 U.S.C. § 119, the content of which in its entirety is herein incorporated by reference.

BACKGROUND

1. Field

Exemplary embodiments of the invention relate to electronic devices. More particularly, exemplary embodiments of the invention relate to head mounted display devices and image correction methods for the same.

2. Discussion of Related Art

A display device, such as a head mounted display ("HMD") device, may provide augmented reality experiences by displaying virtual images over a real-world background that is viewable through a display panel. As a user of a see-through display device changes user's location and/or orientation in a use environment, the see-through display device detects the movements of the user, and updates displayed images accordingly.

When an image such as a logo image is displayed at a fixed position for a long time, corresponding pixels may be deteriorated and an afterimage may be caused. In recent years, a technique of performing a pixel shift operation at predetermined periods in order to prevent afterimage and deterioration of a display device.

SUMMARY

Since a head mounted display device is very close to eyes of a user unlike a general display device, there is a high possibility that an image shake due to a pixel shift is visually recognized, thereby causing disadvantages such as motion sick and nausea, etc.

Exemplary embodiments provide a head mounted display device performing a pixel shift based on a movement of a head mounted display panel.

Exemplary embodiments provide a method of image correction for a head mounted display device performing a pixel shift based on a movement of a head mounted display panel.

According to an exemplary embodiment, a head mounted display device may include a head mounted display panel, a motion tracker which tracks a movement of the head mounted display panel according to a head movement of a user and outputs sensing data, an image corrector which shifts and outputs entire image data based on the sensing data when the head mounted display panel rotates, a data driver which converts the entire image data output from the image corrector into a data signal and provides the data signal to the head mounted display panel, and a scan driver which provides a scan signal to the head mounted display panel.

In an exemplary embodiment, the image corrector may shift the entire image data in the same direction as a turning direction of the head mounted display panel.

In an exemplary embodiment, the image corrector may shift the entire image data in a direction opposite to a turning direction of the head mounted display panel.

In an exemplary embodiment, the image corrector may shift the entire image data in a predetermined pattern regardless of a turning direction of the head mounted display panel when the sensing data is output.

In an exemplary embodiment, the image corrector may shift the entire image data when a change amount of a rotation angle of the head mounted display panel included in the sensing data is greater than a predetermined threshold.

In an exemplary embodiment, the image corrector may adjust a shift amount of the entire image data based on a change amount of a rotation angle of the head mounted display panel.

In an exemplary embodiment, the image corrector may receive the sensing data at a predetermined cycle and shifts the entire image data based on the sensing data.

In an exemplary embodiment, the image corrector may include a comparator which compares a change amount of a rotation angle of the head mounted display panel calculated based on the sensing data with a predetermined threshold to determine whether to shift the entire image data and a shift controller which determines a shift amount and a shift direction of the entire image data based on the change amount of the rotation angle.

In an exemplary embodiment, the comparator may output a shift enable signal for shifting the entire image data when at least one of the change amount of the rotation angle in a vertical direction and the change amount of the rotation angle in a horizontal direction is greater than the predetermined threshold.

In an exemplary embodiment, the shift controller may determine the shift amount as a constant value regardless of the change amount of the rotation angle when the shift enable signal is output.

In an exemplary embodiment, the shift controller may increase the shift amount in a form of a step function as the change amount of the rotation angle increases.

In an exemplary embodiment, the shift controller may decrease the shift amount in a form of a step function as the change amount of the rotation angle increases.

According to an exemplary embodiment, a method of image correction for a head mounted display device may include generating sensing data by tracking a movement of a head mounted display panel according to head movement of a user, shifting entire image data based on the sensing data, and outputting a shifted image to the head mounted display panel based on a shifted image data.

In an exemplary embodiment, the entire image data may be shifted in the same direction as a turning direction of the head mounted display panel.

In an exemplary embodiment, the entire image data may be shifted in a direction opposite to a turning direction of the head mounted display panel.

In an exemplary embodiment, the entire image data may be shifted a predetermined pattern regardless of a turning direction of the head mounted display panel.

In an exemplary embodiment, the shifting the entire image data based on the sensing data may include comparing a change amount of a rotation angle of the head mounted display panel included in the sensing data with a predetermined threshold, and determining a shift amount of the image and a shift direction of the entire image data when the change amount of the rotation angle is greater than the predetermined threshold.

In an exemplary embodiment, the shift amount may be increased in a form of a step function as the change amount of the rotation angle increases.

In an exemplary embodiment, the shift amount may be decreased in a form of a step function as the change amount of the rotation angle increases.

Therefore, the head mounted display device and the method of image correction for the same according to exemplary embodiments may shift the entire image only when the head mounted display panel rotates based on the movement of the user's head or eyes, so that the image shift (i.e., a pixel shift) is not recognized to the user and pixel deterioration and image retention in a fixed image (e.g., logo images) may be prevented. Further, the deterioration and afterimage may be prevented without an algorithm and hardware configuration for fixed image (i.e., static image) detection.

BRIEF DESCRIPTION OF THE DRAWINGS

Exemplary embodiments, advantages and features of this disclosure can be understood in more detail from the following description taken in conjunction with the accompanying drawings, in which.

DETAILED DESCRIPTION

Exemplary embodiments will be described more fully hereinafter with reference to the accompanying drawings, in which various embodiments are shown. This invention may, however, be embodied in many different forms, and should not be construed as limited to the exemplary embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Figure 1:
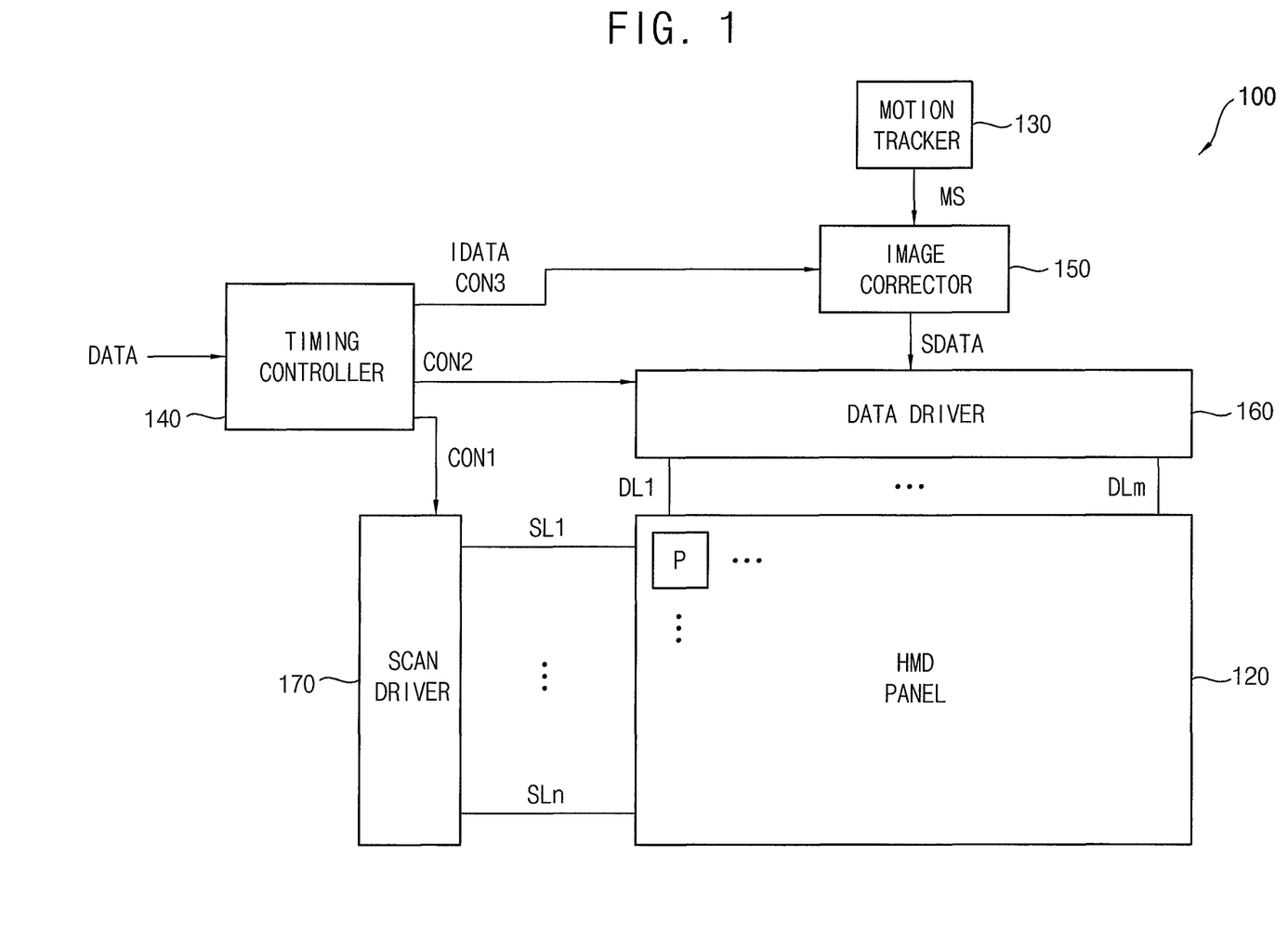
FIG. 1 is a block diagram of an exemplary embodiment of a head mounted display device.

FIG. 1 is a block diagram of a head mounted display device according to exemplary embodiments.

Referring to FIG. 1, the head mounted display device 100 may include a head mounted display panel 120, a motion tracker 130, an image corrector 150, a data driver 160, and a scan driver 170. The head mounted display device 100 may further include a timing controller 140.

In an exemplary embodiment, the head mounted display device 100 may display a virtual reality ("VR") stereoscopic image and/or an augmented reality ("AR") stereoscopic image.

The head mounted display panel 120 may include a plurality of pixels P. Since the head mounted display panel 120 may be close to a user's eyes, the user may not see all the pixels P. Thus, in general, the pixels P disposed at an outer portion of the head-mounted display panel 120 are not used for the image display. A pixel shift technique of the illustrated exemplary embodiments is to prevent image retention and deterioration by shifting the image to the unused outline pixels based on predetermined conditions.

The head mounted display panel 120 may be connected to the scan driver 170 via a plurality of scan lines SL1 to SLn and connected to the data driver 160 via a plurality of data lines DL1 to DLm, where m and n are positive integers. The head mounted display panel 120 may include m pixel columns respectively connected to the data lines DL1 to DLm and n pixel rows respectively connected to the scan lines SL1 to SLn. Since the pixels P may be located at intersections of the scan lines SL1 to SLn and the data lines DL1 to DLm, the head mounted display panel 120 may include n*m pixels P. The head mounted display panel 120 may display the stereoscopic image or the AR image based on image data IDATA received from the timing controller 140 or shifted output image data SDATA received from the image corrector 150.

The motion tracker 130 may track a motion of the head mounted display panel 120 according to a movement of the user's head to output sensing data MS. In some exemplary embodiments, the sensing data MS may include direction data represented by polar coordinate data, rectangular coordinate data, and the like, for example. In an exemplary embodiment, the sensing data MS may include rotational angle and rotational direction information at which the head mounted display panel 120 rotates, for example. In some exemplary embodiments, the motion tracker 130 may include a rotation sensor, a gyro sensor, a gravity sensor, and the like to output the sensing data MS. In an exemplary embodiment, the motion tracker 130 may include one or more cameras (e.g., a depth camera and/or a two-dimensional video camera) and/or an inertial motion detector, and the like, for example. The sensing data MS may be provided to the image corrector 150.

The timing controller 140 may generate a plurality of control signals CON1 and CON2 and provide the signals CON1 and CON2 to the scan driver 170 and the data driver 160 to control the scan driver 170 and the data driver 160, respectively. The timing controller 140 may receive an input control signal and input image data DATA from an image source such as a graphic device. In an exemplary embodiment, the input control signal may include a main clock signal, a vertical synchronization signal, and a horizontal synchronization signal, for example. The timing controller 140 may generate image data IDATA corresponding to operating conditions of the head mounted display panel 120 based on the input image data DATA and may provide the image data IDATA to the data driver 160 or the image corrector 150. In some exemplary embodiments, the timing controller 140 may generate a first control signal CON1 for controlling a driving timing of the scan driver 170 based on the input control signal, a second control signal CON2 for controlling a driving timing of the data driver 160. In some exemplary embodiments, the image corrector 150 may be included in the timing controller 140. In some exemplary embodiments, the image corrector 150 may be disposed in connection with the timing controller 140.

The image corrector 150 may shift the entire image data IDATA based on the sensing data MS. In some exemplary embodiments, the image corrector 150 may delay the image data IDATA output using a buffer, register, etc., or may shift the entire image data IDATA of one frame by delaying an enablement of the data driver 160. In some exemplary embodiments, the image corrector 150 may shift the output image data SDATA in the same direction as a turning direction of the head mounted display panel 120 or a direction opposite to the turning direction based on the sensing data MS. The sensing data MS may include information related to the turning direction (or rotation direction) and a turning angle (or a rotation angle). Accordingly, the head mounted display panel 120 may display a shifted image where the entire image is shifted in the rotation direction or the direction opposite to the rotation direction.

In some exemplary embodiment, the image corrector 150 may shift the image data IDATA in a predetermined pattern regardless of the turning direction of the head mounted display panel 120 when the sensing data MS is output. In an exemplary embodiment, the output image shift may be performed alternately in the left and right directions each time the detection data is output, for example.

However, these are example, and the shifted output image data SDATA and the shift direction are not limited thereto.

In some exemplary embodiments, the image corrector 150 may shift the image data IDATA when a change amount of a rotation angle of the head mounted display panel 120 included in the sensing data MS is greater than a predetermined threshold. Further, the image corrector 150 may adjust the shift amount of the image data IDATA (i.e., the number of pixel lines (or pixels) to which the output image is shifted) based on the change amount of the rotation angle. In an exemplary embodiment, as the rotation amount of the head mount display panel 120 increases, the shift amount of the output image may be increased or decreased, for example.

In some exemplary embodiments, the image corrector 150 may receive the sensing data MS within a predetermined time range at a predetermined cycle and may shift the image data IDATA as described above based on the sensing data MS. That is, the image data shift operation may not be performed every time the head mount display panel 120 moves, but the image data shift operation may be performed when the sensing data MS is output for a predetermined period.

The data driver 160 may convert the shifted output image data SDATA received from the image corrector 150 based on the second control signal CON2 and provide the output image data SDATA to the head mounted display panel 120. In some exemplary embodiments, the data driver 160 may directly receive the image data IDATA from the timing controller 140 when the image shift is not performed.

The scan driver 170 may provide a scan signal to the head mounted display panel 120 based on the first control signal CON1.

As described above, the head mounted display device 100 according to exemplary embodiments may shift the entire image according to the movement of the user's head or eyes, so that the image shift (i.e., a pixel shift) is not recognized to the user, and pixel deterioration and image retention in a fixed image (e.g., pattern) may be prevented. Further, the deterioration and afterimage may be prevented without an algorithm and hardware configuration for fixed image (i.e., static image) detection.

Figure 2:
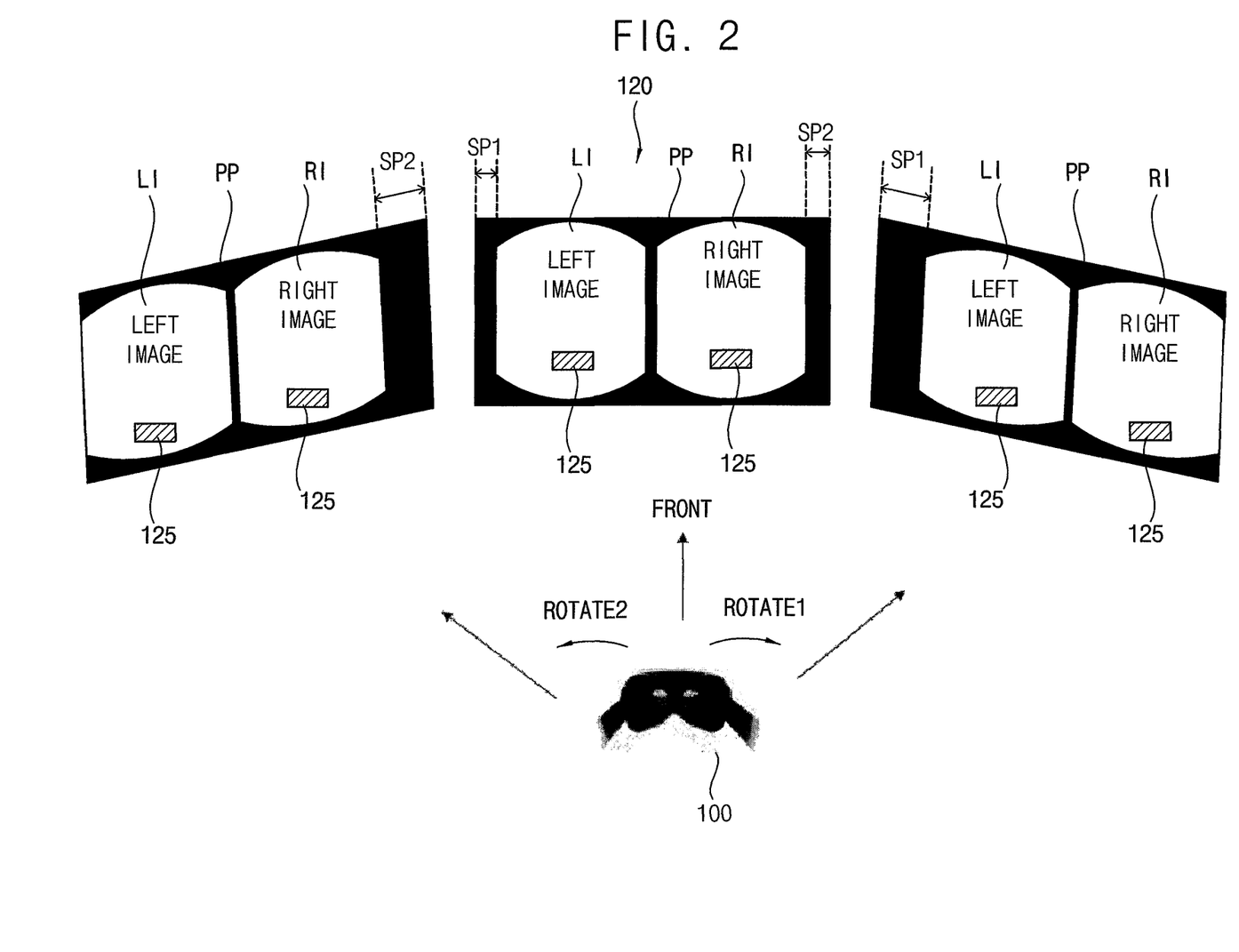
FIG. 2 is a diagram illustrating an example in which the head mounted display device of FIG. 1 shifts an entire output image based on a movement of a head mounted display panel.

FIG. 2 is a diagram illustrating an example in which the head mounted display device of FIG. 1 shifts an entire output image based on a movement of a head mounted display panel.

Referring to FIGS. 1 and 2, the image corrector 150 may shift the image data IDATA in the same direction as the turning (rotating) direction of the head mounted display panel 120.

The head mounted display panel 120 may output a left-eye image LI and a right-eye image RI. Each of the left-eye image LI and the right-eye image RI may display a fixed pattern (i.e., static pattern) 125. In an exemplary embodiment, the fixed pattern 125 may be, for example, fixedly displayed information in a VR display and an AR display, and the like, for example.

Since the head mount display panel 120 is close to the eyes of the user, an image area perceived by the eyesight is limited by one eye. Therefore, in general, the peripheral pixels PP disposed in the outer portions of the left eye image LI and the right eye image RI are not used for an image display.

The image corrector 150 may shift the output image when the head mounted display panel 120 moves (rotates) so that the peripheral pixels PP display the image.

As illustrated in FIG. 2, when the head-mounted display device 100 is placed in a predetermined reference state FRONT, for example, in a state of looking at the front, a first peripheral region SP1 which does not display the image may be located on a left side of the left-eye image LI and a second peripheral region SP2 which does not display the image may be located one a right side of the right-eye image RI. In an exemplary embodiment, each of the first and second peripheral regions SP1 and SP2 may include predetermined pixel columns, for example.

When the head mounted display device 100 is rotated (i.e., turned) to the right from the reference state FRONT (represented by ROTATE1 in FIG. 2), the image corrector 150 may shift the image data IDATA so that the output image is shifted to the right side of the head mounted display panel 120. In an exemplary embodiment, the image corrector 150 may delay the output of the image data IDATA, for example. Accordingly, the number of pixel columns included in the first peripheral region SP1 may be increased. In other words, the left-eye image LI and the right-eye image RI may be shifted to the right by a predetermined number of pixels. In an exemplary embodiment, the left-eye image LI and the right-eye image RI may be shifted to the right by 20 pixels in a row direction (i.e., 20 pixel columns), for example. However, the invention is not limited thereto, and the number of pixel columns by which the left-eye image LI and the right-eye image RI may be shifted to the right may be less than or greater than 20.

When the head mounted display device 100 is rotated (i.e., turned) to the left from the reference state FRONT (represented by ROTATE2 in FIG. 2), the image corrector 150 may shift the image data IDATA so that the output image is shifted to the left side of the head mounted display panel 120. In an exemplary embodiment, the image corrector 150 or the timing controller 140 may delay the enable timing of the data enable signal for driving the data driver 160 in one frame, for example. Accordingly, the number of pixel columns included in the second peripheral region SP2 may be increased. In other words, the left-eye image LI and the right-eye image RI may be shifted to the left by a predetermined number of pixels. In an exemplary embodiment, the left-eye image LI and the right-eye image RI may be shifted to the left by 30 pixels in a row direction (i.e., 30 pixel columns), for example. However, the invention is not limited thereto, and the number of pixel columns by which the left-eye image LI and the right-eye image RI may be shifted to the left may be less than or greater than 30.

Since the aforementioned descriptions are examples, the image shift directions are not limited thereto. In an exemplary embodiment the image shift may be performed in an upward direction, a downward direction, and the diagonal direction according to the rotational direction of the head mount display panel 120, for example.

The shift amount of the image data in one direction is limited. In some exemplary embodiments, when the output image is shifted to the maximum rightward, when the head mount display panel 120 rotates to the right, the image corrector 150 may shift the image data IDATA and the output image to the left.

As described above, when the head or the eyesight of the user is moved, the head-mounted display device 100 shifts the output image corresponding to the rotational direction of the head mounted display panel 120. Thus, deterioration and afterimage at the fixed pattern (e.g., a logo pattern) 125 may be prevented.

Figure 3:
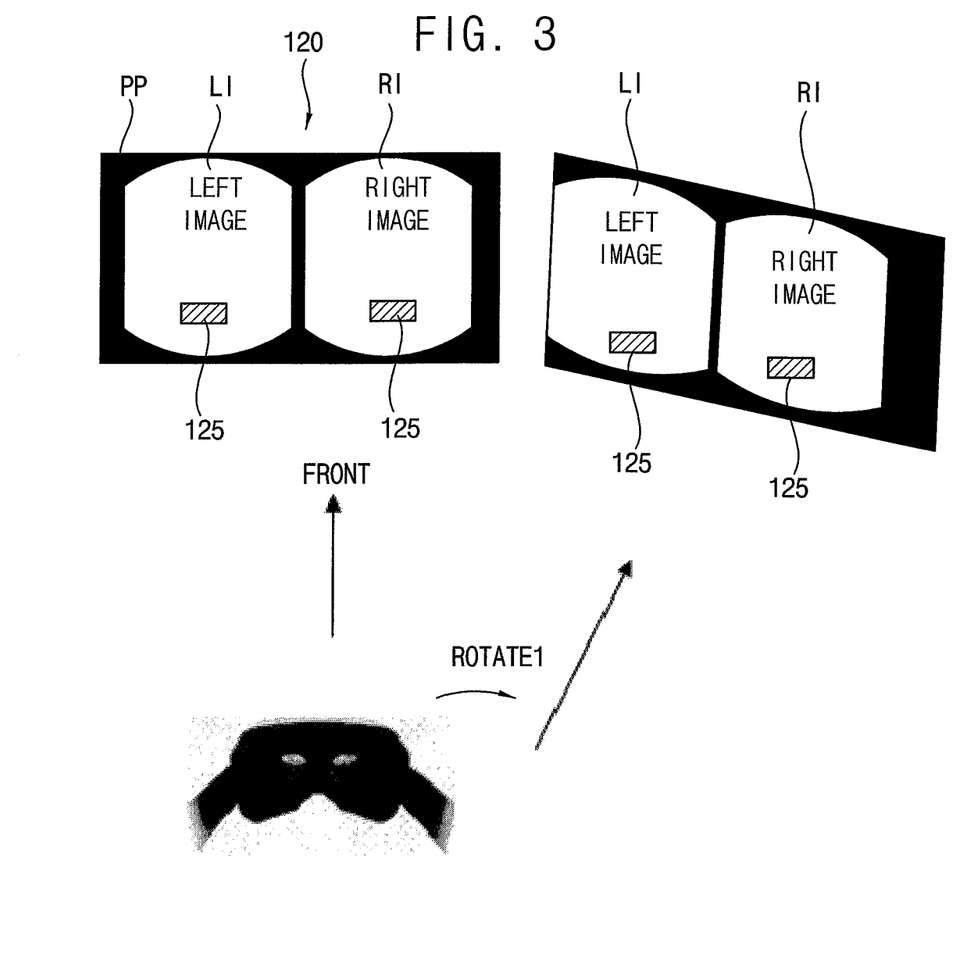
FIG. 3 is a diagram illustrating another example in which the head mounted display device of FIG. 1 shifts an entire output image based on a movement of a head mounted display panel.

FIG. 3 is a diagram illustrating another example in which the head mounted display device of FIG. 1 shifts an entire output image based on a movement of a head mounted display panel.

Referring to FIGS. 1 and 3, the image corrector 150 may shift the image data IDATA to in a direction opposite to a turning (rotating) direction of the head mounted display panel 120. Thus, the output image may be shifted in the direction opposite to the turning direction of the head mounted display panel 120.

As illustrated in FIG. 3, when the head mounted display device 100 is rotated (turned) to the right from the reference state FRONT (represented by ROTATE1 in FIG. 3), the image corrector 150 may shift the image data IDATA so that the output image is shifted to the left side of the head mounted display panel 120. Accordingly, the left-eye image LI and the right-eye image RI may be shifted to the left by a predetermined number of pixels. In an exemplary embodiment, the left-eye image LI and the right-eye image RI may be shifted to the left by 20 pixels in a row direction (i.e., 20 pixel columns), for example. However, the invention is not limited thereto, and the number of pixel columns by which the left-eye image LI and the right-eye image RI may be shifted to the left may be less than or greater than 20.

Since the aforementioned descriptions are examples, the image shift directions are not limited thereto. In an exemplary embodiment the image shift may be performed in an upward direction, a downward direction, and the diagonal direction according to the rotational direction of the head mount display panel 120, for example.

Figure 4:
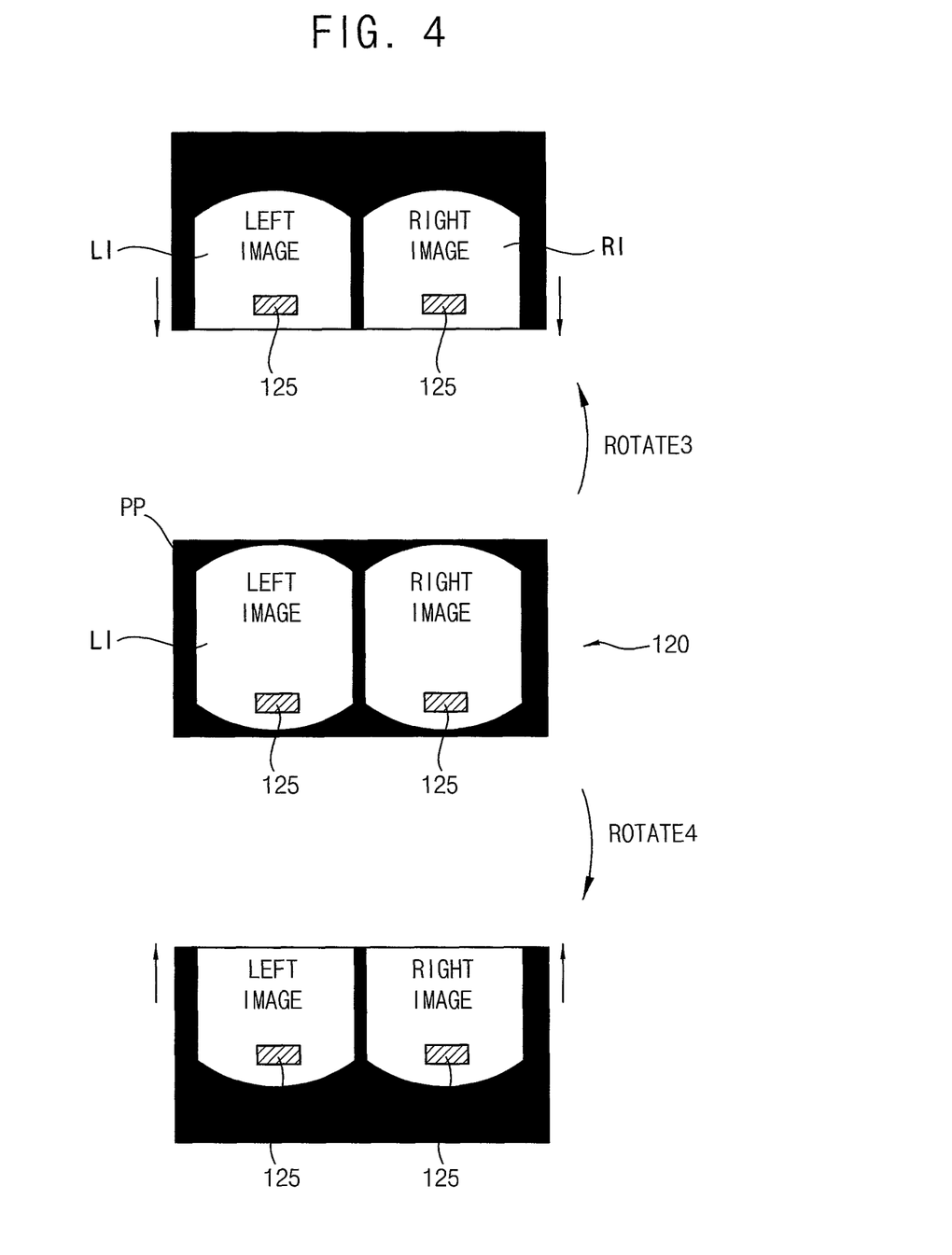
FIG. 4 is a diagram illustrating still another example in which the head mounted display device of FIG. 1 shifts an entire output image based on a movement of a head mounted display panel.

FIG. 4 is a diagram illustrating still another example in which the head mounted display device of FIG. 1 shifts an entire output image based on a movement of a head mounted display panel.

Referring to FIGS. 1 and 4, when the head mounted display device 100 is rotated (e.g., turned) to the upward or downward from the reference state FRONT (represented by ROTATE3 and ROTATE4 in FIG. 4), the image corrector 150 may shift the image data IDATA so that the output image is shifted to the upward or downward of the head mounted display panel 120, respectively.

Since the aforementioned descriptions are examples, the image shift directions and shift pattern are not limited thereto.

In some exemplary embodiments, the output image may be shifted in a predetermined pattern regardless of a turning direction of the head mounted display panel when the sensing data MS is output according to the rotation of the head mounted display panel 120. In an exemplary embodiment, the output image shift may be performed alternately in the left and right directions each time the detection data is output, for example.

Figure 5:
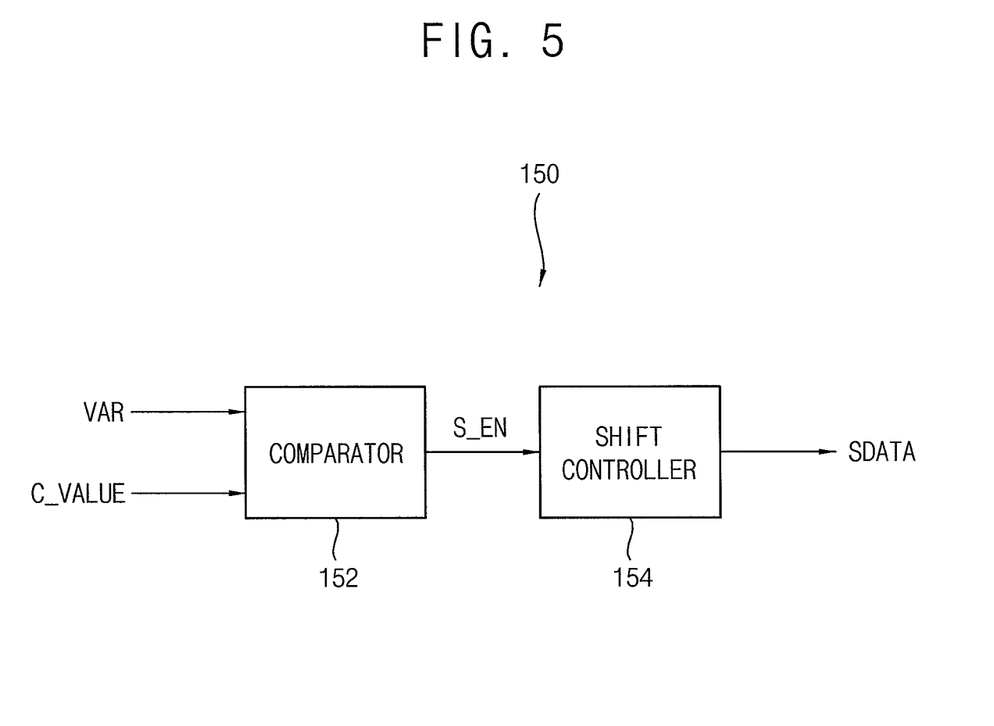
FIG. 5 is a block diagram illustrating an example of an image corrector included in the head mounted display device of FIG. 1.

FIG. 5 is a block diagram illustrating an example of an image corrector 150 included in the head mounted display device 100 of FIG. 1, and FIGS. 6A to 6C are graphs illustrating examples of a relationship between a change amount of a rotation angle of the head mounted display device 100 of FIG. 1 and a shift amount of the output image.

Referring to FIGS. 1, 5, 6A, 6B, and 6C, the image corrector 150 may include a comparator 152 and a shift controller 154.

The comparator 152 may compare a change amount of a rotation angle VAR of the head mounted display panel 120 calculated based on the sensing data MS with a predetermined threshold C_VALUE to determine whether to shift the image data IDATA. In some exemplary embodiments, the change amount of the rotation angle VAR may be determined by a difference between the rotation angles sensed at predetermined time points. In some exemplary embodiments, the comparator 152 may output a shift enable signal S_EN to shift the image data IDATA when at least one of the change amount of the rotation angle VAR in a horizontal direction and the change amount of the rotation angle VAR in a vertical direction is greater then the threshold C_VALUE. Also, when the change amount of the rotation angle VAR in the horizontal direction and the change amount of the rotation angle VAR in the vertical direction are all equal to or less than the threshold value C_VALUE, the image data IDATA shift operation may be disabled.

The shift controller 154 may determine a shift amount and a shift direction of the image data IDATA based on the change amount of the rotation angle VAR. Here, the shift amount may be the number of pixel (or pixel lines) that are shifted. In some exemplary embodiments, the shift direction may correspond to the turning (or rotating) direction of the head mounted display panel 120 or an opposite direction with respect to the turning direction of the head mounted display panel 120. In some exemplary embodiments, the shift direction may be determined regardless of the turning direction of the head mounted display panel 120.

Figure 6A:
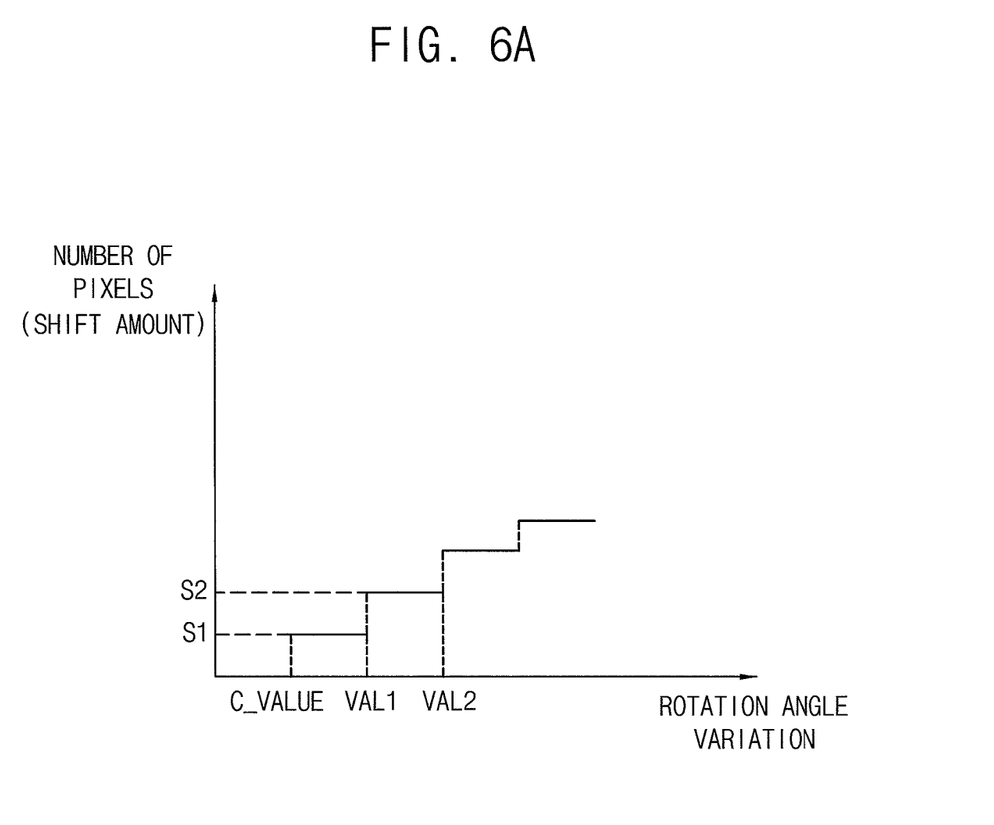
FIGS. 6A to 6C are graphs illustrating examples of a relationship between a change amount of a rotation angle of the head mounted display device of FIG. 1 and a shift amount of the output image.

In some exemplary embodiments, as illustrated in FIG. 6A, the shift controller 154 may increase the shift amount in a form of a step function as the change amount of the rotation angle VAR increases. The shift enable signal S_EN is not output or the image data IDATA are not shifted when the change amount of the rotation angle VAR is less than or equal to the threshold C_VALUE. The shift amount may be determined as a first shifting value S1 when the change amount of the rotation angle VAR is between the threshold C_VALUE and a first set value VAL1. The shift amount may be determined as a second shifting value S2 greater than the first shifting value S1 when the change amount of the rotation angle VAR is between the first set value VAL1 and a second set value VAL2.

Figure 6B:
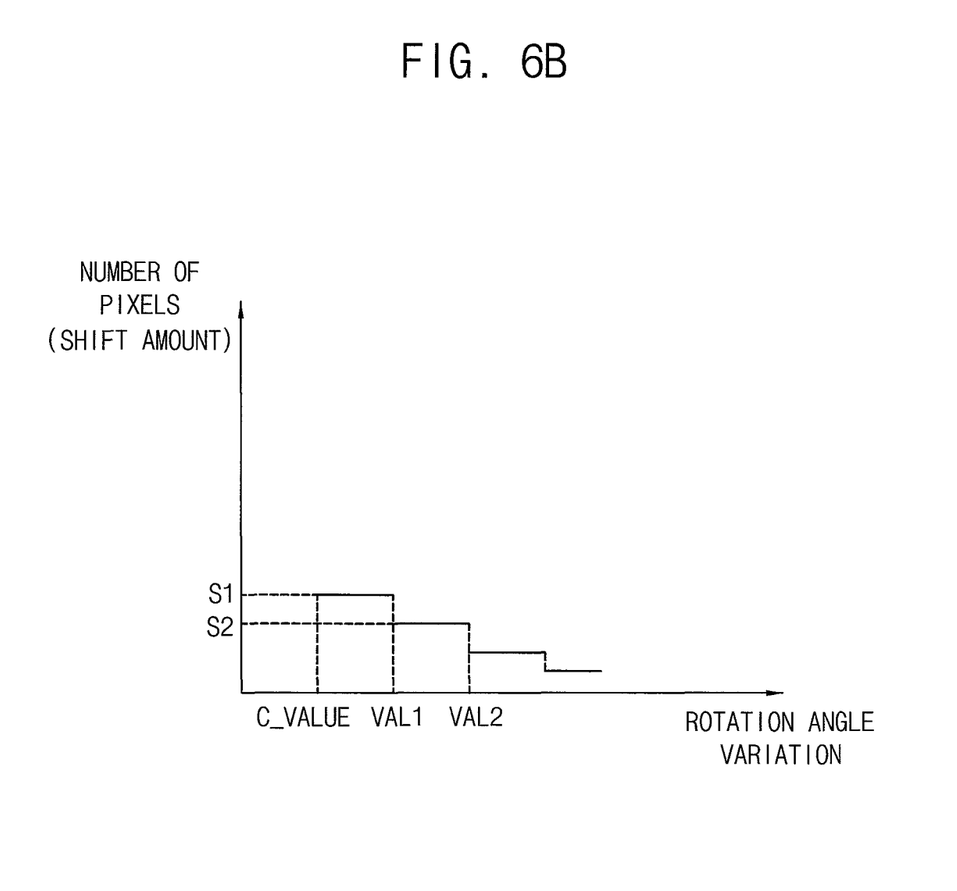

In some exemplary embodiments, as illustrated in FIG. 6B, the shift controller 154 may decrease the shift amount in a form of a step function as the change amount of the rotation angle VAR increases. The shift enable signal S_EN is not output or the image data IDATA are not shifted when the change amount of the rotation angle VAR is less than or equal to the threshold C_VALUE. The shift amount may be determined as a first shifting value S1 when the change amount of the rotation angle VAR is between the threshold C_VALUE and a first set value VAL1. The shift amount may be determined as a second shifting value S2 less than the first shifting value S1 when the change amount of the rotation angle VAR is between the first set value VAL1 and a second set value VAL2.

Figure 6C:
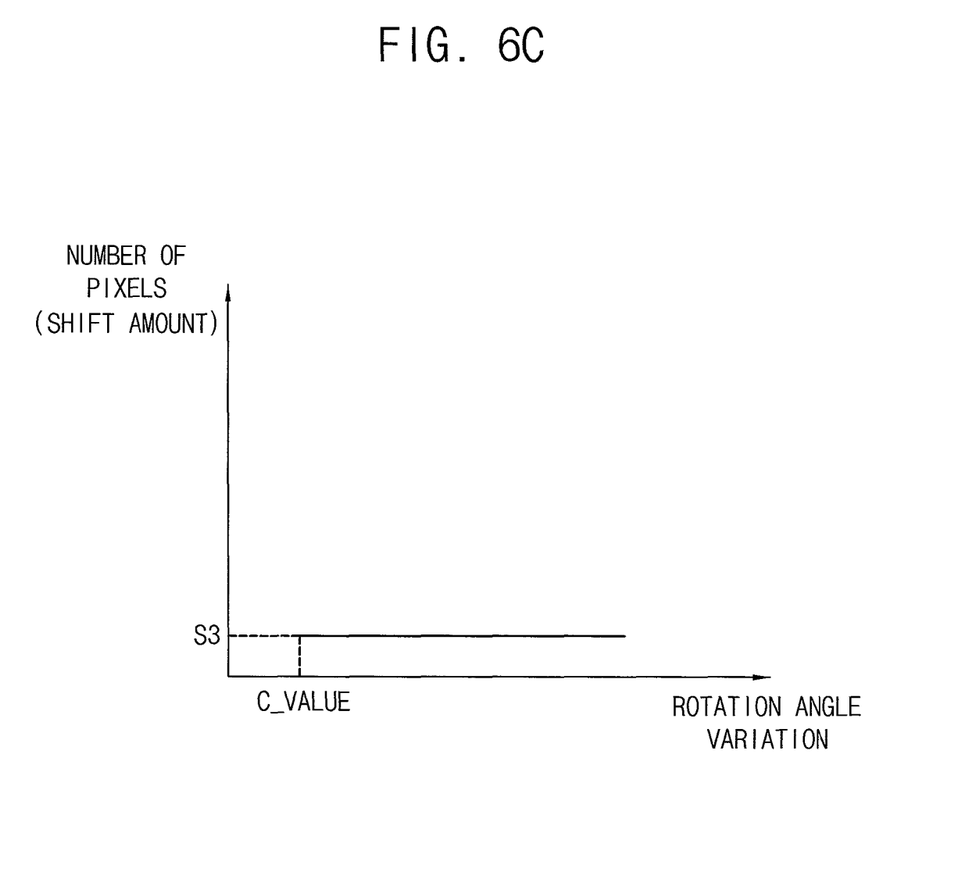

In some exemplary embodiments, the shift controller 154 may determines the shift amount as a constant value regardless of the change amount of the rotation angle VAR when the shift enable signal S_EN is output. In an exemplary embodiment, as illustrated in FIG. 6C, the shift amount may be determined as a predetermined set value S3 when the shift enable signal S_EN is output, for example. The output image may be shifted by a predetermined number of pixels corresponding to the set value S3.

As described above, the head mounted display device according to exemplary embodiments may shift the entire output image in the predetermined shift amount and shift direction when the user's head or eyesight moves exceeds the threshold C_VALUE, thereby preventing pixel deterioration and afterimage in the fixed image (pattern). Further, the image shift is not recognized to the user.

Figure 7:
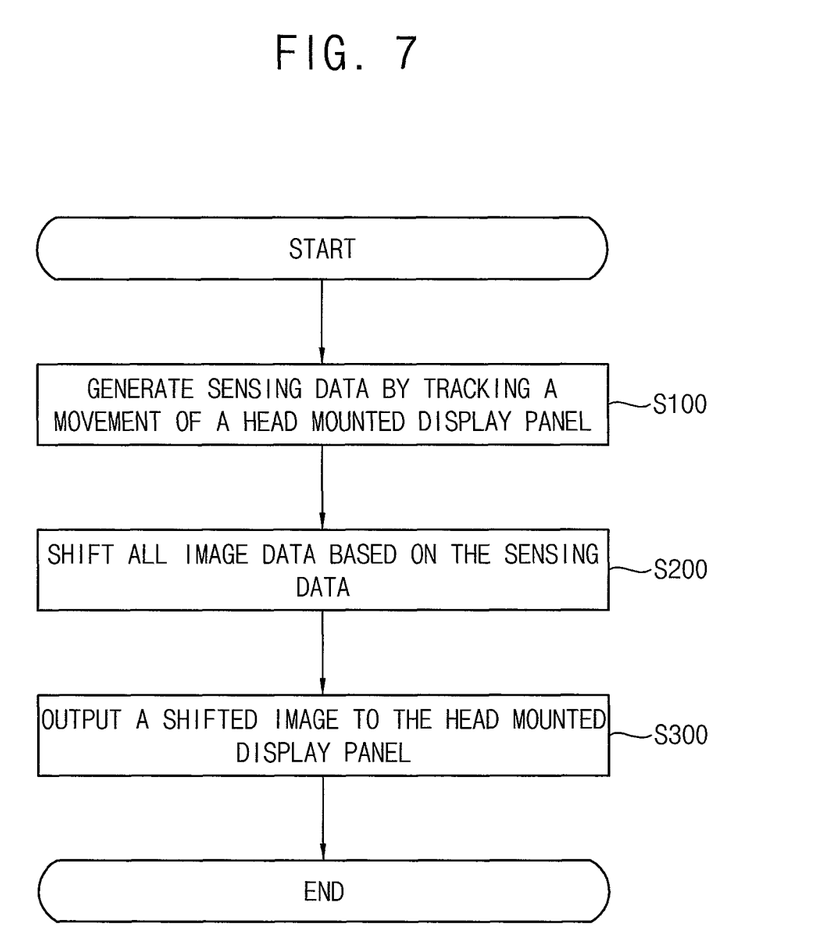
FIG. 7 is a flow chart of a method of image correction for a head mounted display device.
Figure 8:
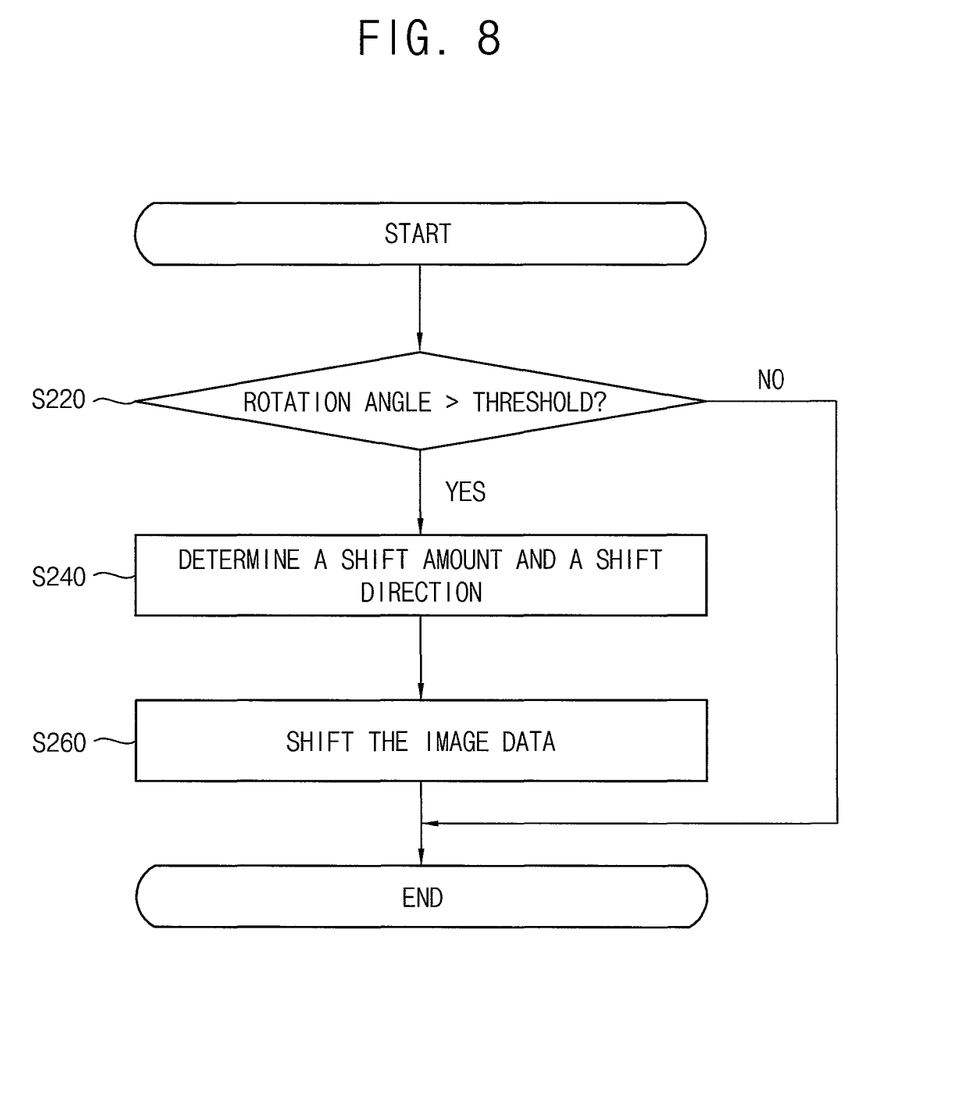
FIG. 8 is a flow chart illustrating an example of a method for shifting image data in the image correction method of FIG. 7.

FIG. 7 is a flow chart of a method of image correction for a head mounted display device. FIG. 8 is a flow chart illustrating an example of a method for shifting image data in the image correction method of FIG. 7.

Referring to FIGS. 7 and 8, the method of image correction for the head mounted display device may include generating sensing data by tracking a movement of a head mounted display panel according to head movement of a user (S100), shifting entire image data based on the sensing data (S200), and outputting a shifted image to the head mounted display panel based on the shifted image data (S300).

The sensing data may be generated by tracking the movement of the head mounted display panel according to head movement of the user (S100). In some exemplary embodiments, the sensing data may include direction data represented by polar coordinate data, rectangular coordinate data, and the like. In an exemplary embodiment the sensing data may include rotational angle and rotational direction information at which the head mounted display panel rotates, for example.

The entire image data may be shifted and output based on the sensing data (S200 and S300). In some exemplary embodiments, the image data may be shifted in the same direction as a turning direction of the head mounted display panel. In some exemplary embodiments, the image data may be shifted in a direction opposite to the turning direction of the head mounted display panel. In some exemplary embodiments, the image data may be shifted in a predetermined pattern regardless of the turning direction of the head mounted display panel.

As illustrated in FIG. 8, in some exemplary embodiments, a change amount of the rotation angle may be compared with a predetermined threshold (S220). The shift amount and direction of the image may be determined when the change amount of the rotation angle is greater than the threshold (S240), and the image data may be shifted and output based on the determined shift amount and direction (S260). Accordingly, the output image may be shifted in a predetermined direction.

Since the image correcting method for the head mounted display device is described in detail with reference to FIGS. 1 to 6C, duplicated descriptions will not be repeated.

As described above, the image correcting method for the head mounted display device may shift the entire output image with a predetermined shift amount and direction when the user's head or eyesight moves greater than the threshold, so that the image shift (i.e., pixel shift) is not recognized to the user and the pixel deterioration and afterimage may be prevented.

Figure 9A:
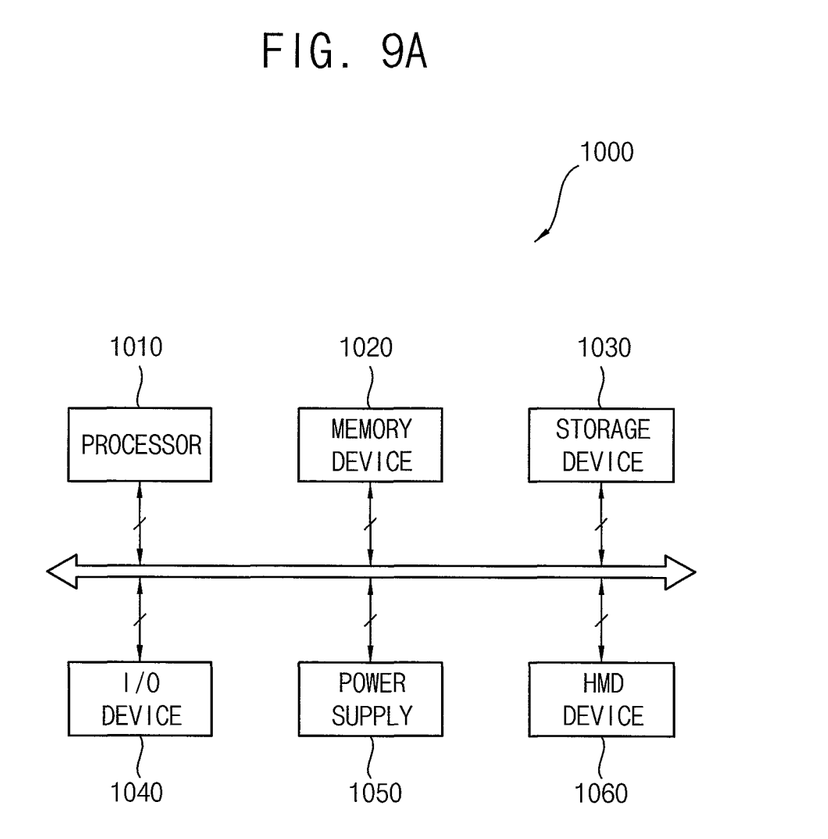
FIG. 9A is a block diagram of an exemplary embodiment of an electronic device.
Figure 9B:
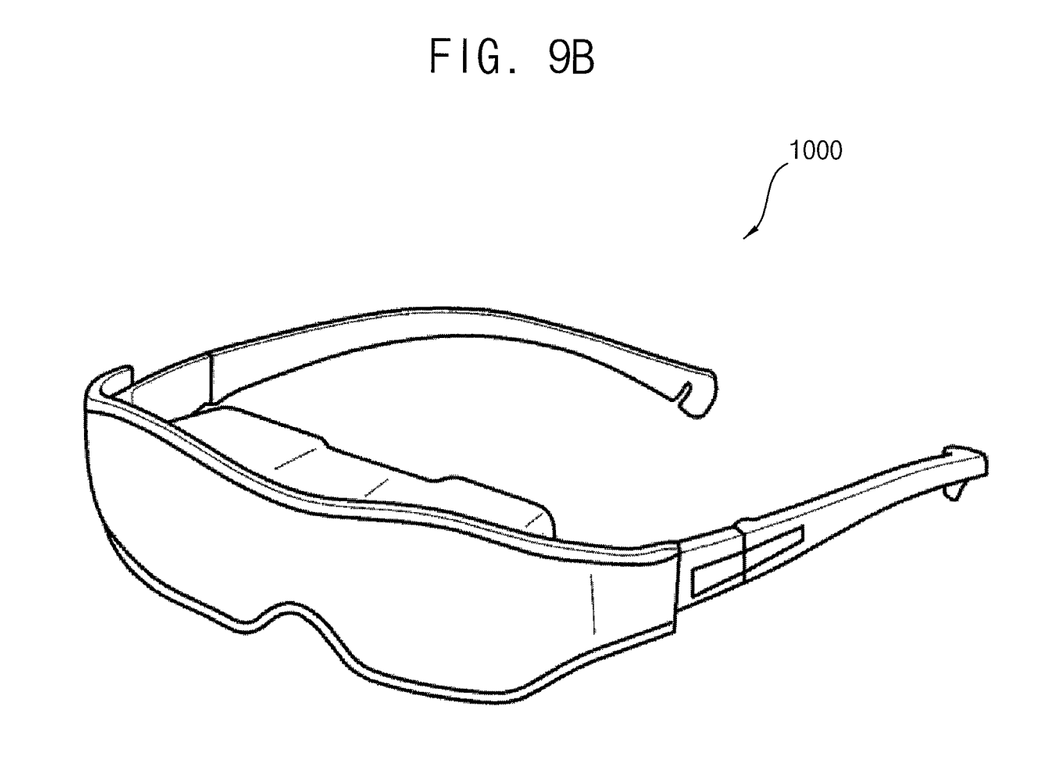
FIG. 9B is a diagram illustrating an example of the electronic device implemented as a head mounted electronic device.

FIG. 9A is a block diagram of an electronic device according to exemplary embodiments. FIG. 9B is a diagram illustrating an example of the electronic device implemented as a head mounted electronic device.

Referring to FIGS. 9A and 9B, the electronic device 1000 may include a processor 1010, a memory device 1020, a storage device 1030, an input/output ("I/O") device 1040, a power supply 1050, and a head mounted display device 1060. Here, the head mounted display device 1060 may correspond to the head mounted display device of FIG. 1. In addition, the electronic device 1000 may further include a plurality of ports for communicating with a video card, a sound card, a memory card, a universal serial bus ("USB") device, and other suitable electronic devices, etc., for example. In one exemplary embodiment, as illustrated in FIG. 9B, the electronic device 1000 may be implemented in a head mounted electronic device, for example.

The processor 1010 may perform various suitable computing functions. In exemplary embodiments, the processor 1010 may be a microprocessor, a central processing unit ("CPU"), etc., for example. The processor 1010 may be coupled to other suitable components via an address bus, a control bus, a data bus, etc. In an exemplary embodiment, the processor 1010 may be coupled to an extended bus such as a peripheral component interconnection ("PCI") bus, for example.

The memory device 1020 may also store data for operations of the electronic device 7000. In an exemplary embodiment, the memory device 1020 may include at least one non-volatile memory device, such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device, such as a dynamic random access memory ("DRAM") device, a static random access memory ("SRAM") device, a mobile DRAM device, and/or the like, for example.

The storage device 1030 may store data for operations of the electronic device 1000. In exemplary embodiments, the storage device 1030 may be a solid state drive ("SSD") device, a hard disk drive ("HDD") device, a CD-ROM device, and/or the like, for example.

In exemplary embodiments, the I/O device 1040 may be an input device, such as a keyboard, a keypad, a touchpad, a touch-screen, a mouse, and/or the like, and an output device, such as a printer, a speaker, and/or the like.

The power supply 1050 may provide power for operating the electronic device 1000.

The head mounted display device 1060 may be connected to other elements via the buses or other communication links. The head mounted display device 100 may display a VR stereoscopic image and/or an AR stereoscopic image, for example. As described above, the head mounted display device 1060 may track the movement of the head mounted display panel according to a head movement of the user, and shift the entire image when the head mounted display panel rotates. To this end, the head mounted display device 1060 may include the above-described head mounted display panel, the motion tracker, the image corrector, the data drive, the scan driver, and the timing controller.

The illustrated exemplary embodiments may be applied to any head mounted display device and any system including the head mounted display device.

The foregoing is illustrative of exemplary embodiments, and is not to be construed as limiting thereof. Although a few exemplary embodiments have been described, those skilled in the art will readily appreciate that many modifications are possible in the exemplary embodiments without materially departing from the novel teachings and advantages of exemplary embodiments. Accordingly, all such modifications are intended to be included within the scope of exemplary embodiments as defined in the claims. In the claims, means-plus-function clauses are intended to cover the structures described herein as performing the recited function and not only structural equivalents but also equivalent structures. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A head mounted display device, comprising:
   a head mounted display panel;
   a motion tracker which tracks a movement of the head mounted display panel according to a head movement of a user and outputs sensing data;
   an image corrector which shifts and outputs entire image data based on the sensing data when the head mounted display panel rotates;

a data driver which converts the entire image data output from the image corrector into a data signal and provides the data signal to the head mounted display panel; and a scan driver which provides a scan signal to the head mounted display panel wherein the image corrector includes:

a comparator which compares a change amount of a rotation angle of the head mounted display panel calculated based on the sensing data with a predetermined threshold to determine whether to shift the entire image data; and a shift controller which determines a shift amount and a shift direction of the entire image data based on the change amount of the rotation angle, and wherein the shift controller increases or decreases the shift amount in a form of a step function as the change amount of the rotation angle increases.

2. The device of claim 1, wherein the image corrector shifts the entire image data in the same direction as a turning direction of the head mounted display panel.

3. The device of claim 1, wherein the image corrector shifts the entire image data in a direction opposite to a turning direction of the head mounted display panel.

4. The device of claim 1, wherein the image corrector shifts the entire image data in a predetermined pattern regardless of a turning direction of the head mounted display panel when the sensing data is output.

5. The device of claim 1, wherein the image corrector shifts the entire image data when a change amount of a rotation angle of the head mounted display panel included in the sensing data is greater than a predetermined threshold.

6. The device of claim 1, wherein the image corrector adjusts a shift amount of the entire image data based on a change amount of a rotation angle of the head mounted display panel.

7. The device of claim 1, wherein the image corrector receives the sensing data at a predetermined cycle and shifts the entire image data based on the sensing data.

8. The device of claim 1, wherein the comparator outputs a shift enable signal for shifting the entire image data when at least one of the change amount of the rotation angle in a vertical direction and the change amount of the rotation angle in a horizontal direction is greater than the predetermined threshold.

9. The device of claim 8, wherein the shift controller determines the shift amount as a constant value regardless of the change amount of the rotation angle when the shift enable signal is output.

10. The device of claim 1, wherein the shift controller increases the shift amount in a form of a step function as the change amount of the rotation angle increases.

11. The device of claim 1, wherein the shift controller decreases the shift amount in a form of a step function as the change amount of the rotation angle decreases.

12. A method of image correction for a head mounted display device, the method comprising:

generating sensing data by tracking a movement of a head mounted display panel according to a head movement of a user;

shifting entire image data based on the sensing data; and outputting an entire shifted image to the head mounted display panel based on the shifting the entire image data, and wherein the shift amount is increased or decreased in a form of a step function as the change amount of the rotation angle increases.

13. The method of claim 12, wherein the entire image data are shifted in the same direction as a turning direction of the head mounted display panel.

14. The method of claim 12, wherein the entire image data are shifted in a direction opposite to a turning direction of the head mounted display panel.

15. The method of claim 12, wherein the entire image data are shifted a predetermined pattern regardless of a turning direction of the head mounted display panel.

16. The method of claim 12, wherein the shifting the entire image data based on the sensing data includes:

comparing a change amount of a rotation angle of the head mounted display panel included in the sensing data with a predetermined threshold; and determining a shift amount of the image and a shift direction of the entire image data when the change amount of the rotation angle is greater than the predetermined threshold.

17. The method of claim 16, wherein the shift amount is increased in a form of a step function as the change amount of the rotation angle increases.

18. The method of claim 16, wherein the shift amount is decreased in a form of a step function as the change amount of the rotation angle increases.

* * * * *